United States Patent [19]
Kaczmarek et al.

[11] Patent Number: 5,991,136
[45] Date of Patent: Nov. 23, 1999

[54] PROTECTOR UNIT

[75] Inventors: Richard T. Kaczmarek, Chicago; Arnold M. Ladd, Des Plaines, both of Ill.

[73] Assignee: RELTEC Corporation, Mayfiled Heights, Ohio

[21] Appl. No.: 08/980,961

[22] Filed: Dec. 1, 1997

[51] Int. Cl.⁶ ...................................................... H02H 3/00
[52] U.S. Cl. ...................... 361/93.8; 361/93.9; 361/106; 361/119
[58] Field of Search .................................. 361/119, 117, 361/118, 120, 121, 123–124, 126–127, 56, 91, 111, 106, 93, 93.8, 93.9; 379/412

[56] References Cited

U.S. PATENT DOCUMENTS

| | | | |
|---|---|---|---|
| 3,755,715 | 8/1973 | Klayum et al. | 361/120 |
| 5,195,015 | 3/1993 | Kaczmarek | 361/119 |
| 5,341,270 | 8/1994 | Kaczmarek | 361/119 |

*Primary Examiner*—Michael J. Sherry
*Attorney, Agent, or Firm*—Trexler, Bushnell, Giangiorgi & Blackstone, Ltd.

[57] ABSTRACT

A protector unit for use in retrofitting connector blocks, such as a 300-type connector block or a C-50 frame includes a housing; a back-up, fail-safe assembly for providing a connection to ground; and a positive temperature coefficient limiter ("PTCR") for temporarily preventing the passage of current through the protector unit when an over-current condition is detected and for allowing the passage of current through the protector unit when the over-current condition is no longer detected. The back-up, fail-safe assembly permanently prevents the passage of current through the protector unit when a sustained over-current condition is detected.

9 Claims, 5 Drawing Sheets

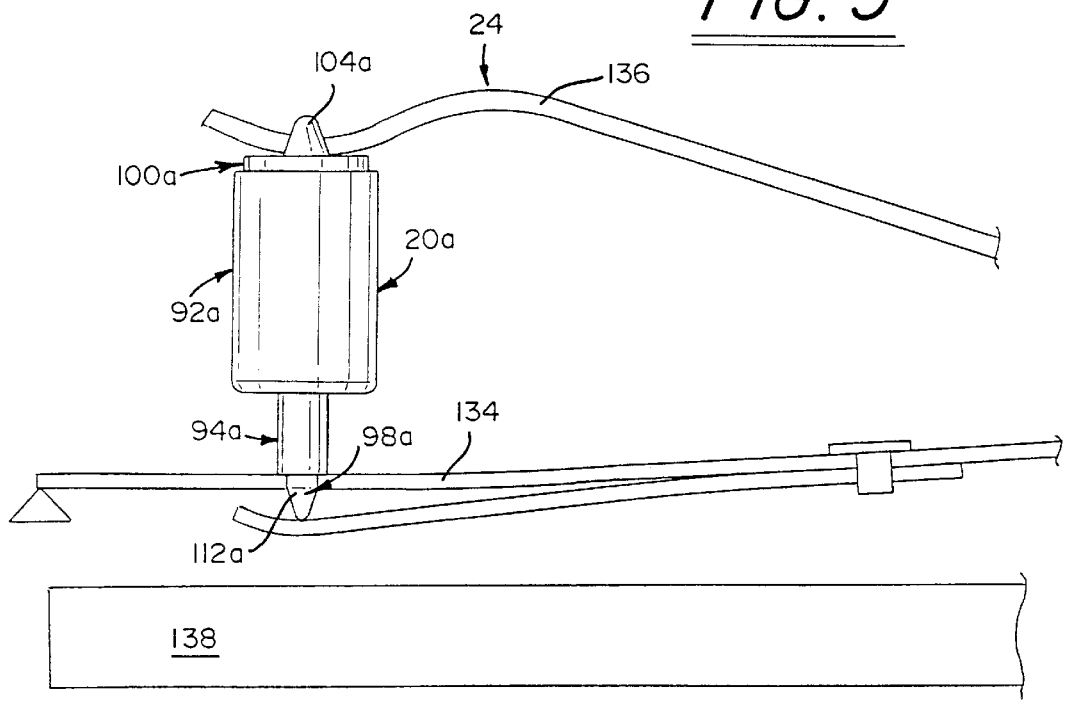
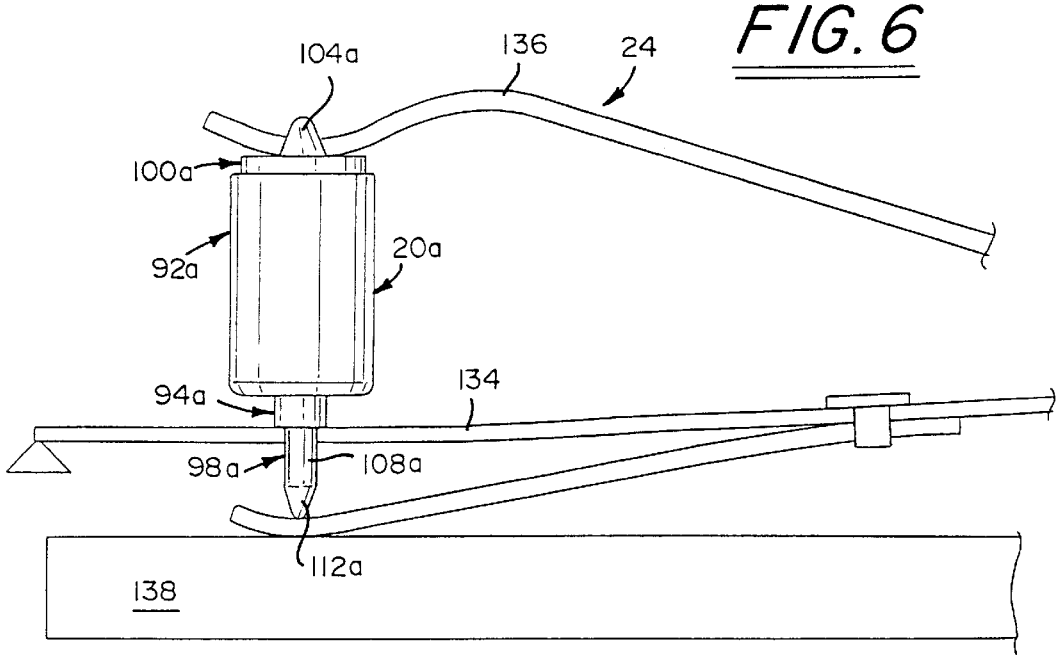

PROTECTOR UNIT

BACKGROUND OF THE INVENTION

This invention is generally directed to a novel resettable protector unit which can be used to retrofit terminal blocks in telecommunications circuits. More particularly, the invention contemplates a novel protector unit which can be reset for multiple uses and also includes a back-up, fail-safe assembly to prevent thermal runaway.

Protector units are used in central offices to provide protection to personnel and equipment from abnormal conditions, such as over-voltages and over-current, induced on telephone lines. A telephone line generally includes a pair of conductors which are referred to as tip and ring conductors. The incoming line pairs are connected to the tip and ring conductors of the central office at a connector block. The protector units are installed in the connector block so as to provide protection for the line from an over-voltage condition and an over-current condition for the incoming line pairs. Generally, a separate protector unit is used for each of the tip and ring conductors of each line pair. The protector units are placed between each tip and ring conductor and a ground circuit.

A brief over-voltage condition generally will cause a temporary grounding of the incoming line until the over-voltage condition has passed. An over-current condition generally causes a permanent grounding of the incoming line. In this case, the protector unit must be removed and replaced on the line which has experienced the over-current condition.

Present current limiters or heat coils, such as the 76A type heat coil, for central offices with model connectors and blocks with protection, such as the C-50 and the 300 Type, are non-resettable when the current limiter or heat coil experiences an over-current condition. These current limiters or heat coils typically incorporate a soldered connection wrapped with resistive wire. When a high sustained current, usually greater than 500 milliamps, flows through the wire, heat is generated and transferred to the soldered connection which melts and allows movement to occur. This movement allows a one-time switching action to occur which grounds the incoming line to protect the telecommunications lines against the over-current. After this one-time switch, the current limiter or heat coil must be disposed of, and replaced, even after the over-current has subsided, or is removed.

The novel protector unit of the present invention is designed to retrofit into existing applications, replacing the 76A heat coil in C-50 connection frames and in 300-Type protectors and other older connection product. The novel protector unit of the present in invention is resettable and incorporates a back-up, fail-safe assembly to prevent thermal runaway. Other features and advantages will become apparent upon a reading of the attached specification and upon a study of the drawings.

OBJECTS AND SUMMARY OF THE INVENTION

A general object of the present invention is to provide a novel protector unit which is designed to retrofit into existing applications, replacing the 76A heat coil in C-50 connection frames and in 300-Type protectors and other older connection product, for protecting a telecommunications line from an over-voltage condition and from an over-current condition.

An object of the present invention is to provide a novel protector unit which is resettable after an over-current condition has occurred so that the protector unit can be used multiple times to protect the telecommunications line from over-current.

Another object of the present invention is to provide a novel protector unit which has a back-up, failsafe assembly to prevent thermal runaway when a sustained over-voltage and/or over-current condition occurs.

Briefly, and in accordance with the foregoing, the present invention envisions a novel protector unit for use in retrofitting connector blocks, such as a 300-type connector block or a C-50 frame. The protector unit includes a housing; a back-up, fail-safe assembly for providing a connection to ground; and a positive temperature coefficient resistor ("PTCR") for temporarily preventing the passage of current through the protector unit when an over-current condition is detected and for allowing the passage of current through the protector unit when the over-current condition is no longer detected. The PTCR switches to a very high impedance state and thermally reacts upon detection of the over-current condition and prevents passage of current through the protector unit. The PTCR thermally cools and returns to an initial state which allows the passage of current through the protector unit when the over-current condition is no longer detected. The PTCR can repeatedly detect an over-current condition and prevent the passage of current through the protector unit and repeatedly cool to allow the passage of current therethrough when the over-current condition is no longer detected. Structure is also provided for permanently preventing the passage of current through the protector unit when a sustained over-current condition is detected.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 5 is a schematic view of the protector unit of the present invention being used in a C-50 frame, which is shown in cross-section under predefined conditions; and FIG. 6 is a schematic view of the protector unit of the present invention being used in a C-50 frame, which is shown in cross-section under predefined conditions.

DETAILED DESCRIPTION OF THE PREFERRED EMBODIMENT

Figure 1:
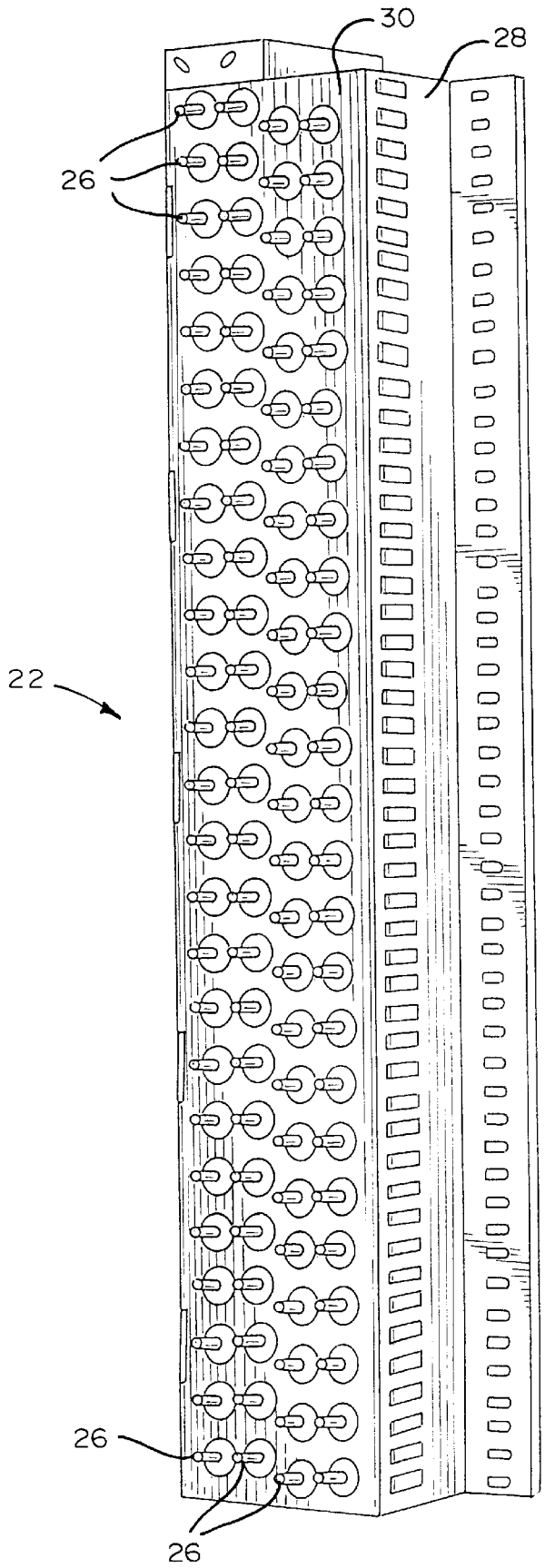
FIG. 1 is a perspective view of a prior art 300-type connector block having a plurality of prior art protector units installed therein, such connector block being capable of accepting the novel protector unit of the present invention for replacement of the prior art protector units installed therein.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 2:
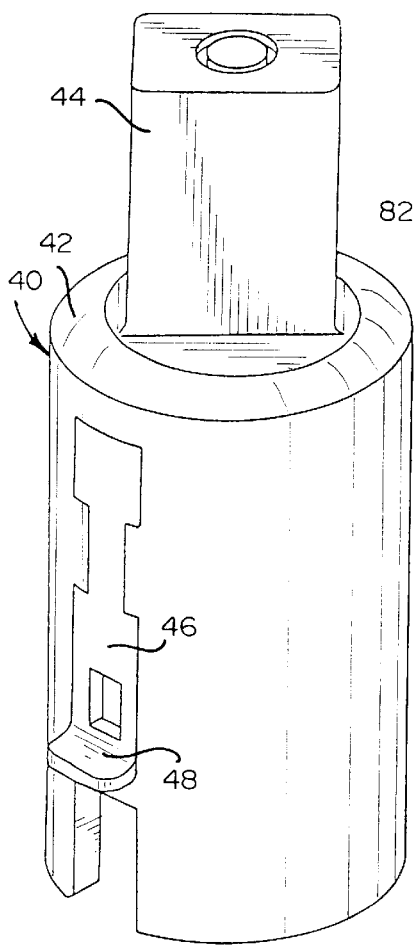
FIG. 2 is an exploded perspective view of the novel protector unit which incorporates the features of the invention.
Figure 2:
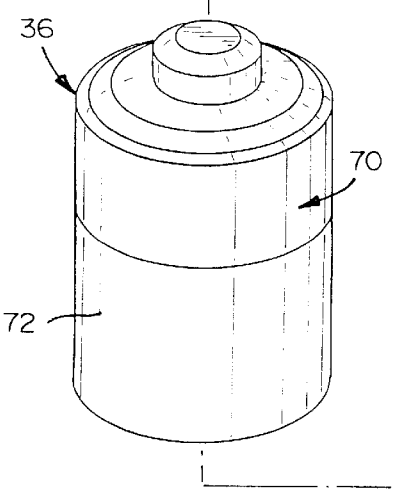
Figure 2:
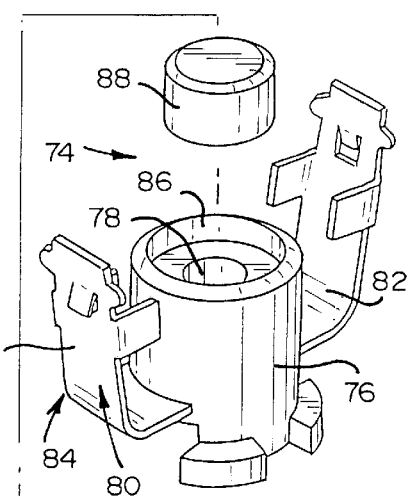
Figure 2:
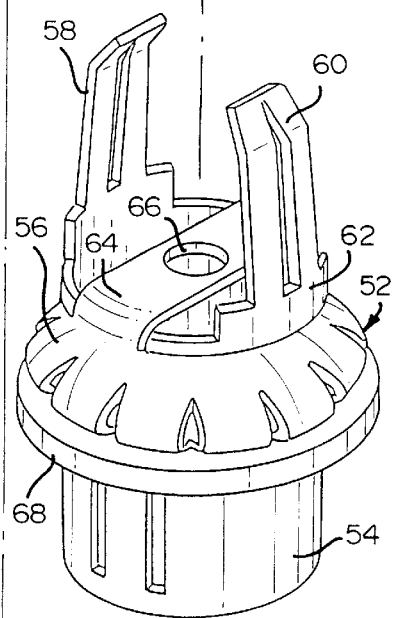
Figure 2:
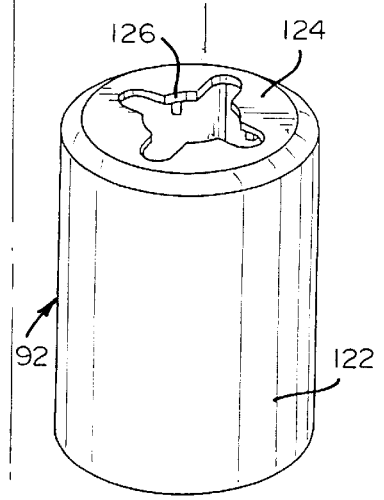
Figure 2:
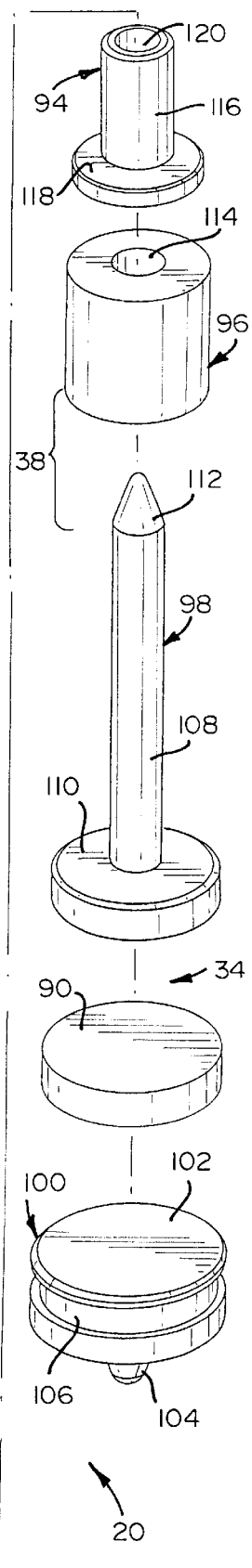

The present invention provides a novel protector unit 20 (see, FIG. 2) which is designed to be retrofit into an existing prior art connector block, such as the 300-type connector block 22 shown in FIG. 1 or the C-50 frame 24 shown in FIGS. 5 and 6. In FIG. 1, the 300-type connector block 22 is shown with a plurality of prior art protector units 26 installed therein. Such prior art protector units 26 are replaced by the novel protector unit 20 of the present invention once the prior art protector unit 26 must be replaced.

Incoming telephone line pairs, each consisting of a tip and ring conductor from a subscriber's line are connected to the corresponding tip and ring conductors of corresponding central office (C.O.) pairs at the connector block, such as the 300-type connector block 22 shown in FIG. 1. The respective conductors from the subscriber's line and from the corresponding C.O. line are connected at the rear of the connector block 22. As shown in FIG. 1, the 300-type connector block 22 comprises a non-conductive and preferably molded plastic housing portion 28 on which is mounted a conductive and preferably metal faceplate 30. The faceplate 30 is electrically coupled to electrical ground.

The connector block 22 has a number of receptacles 32, each of which receives a protector unit 20. There is one receptacle 32 and one protector unit 20 for each of the conductors of each telephone line pair. The 300-type connector block 22 shown in FIG. 1 can protect up to fifty line pairs, and therefore, has one hundred receptacles 32 which can accept up to one hundred protector units 20. The protector unit 20 is placed in electrical series with the line it is intended to protect.

Referring now to FIGS. 2–6, the protector unit 20 of the present invention includes a resettable over-current assembly 34, an over-voltage arrester assembly 36 and a gas tube, fail-safe assembly 74, and 88, to prevent thermal runaway. This protector unit 20 is used in areas where frequent over-current conditions and transient over-voltage conditions are a problem or where tightly controlled breakdown values are required.

The protector unit 20 of the present invention includes a non-conductive and preferably plastic housing or cap 40. The cap 40 includes a hollow, generally cylindrical body portion 42 and a projecting finger-grip portion 44 to permit manual insertion and removal of the protector unit 20 relative to the connector block receptacle 32. The body portion 42 receives a generally U-shaped conductive ground strip 46 having oppositely, outwardly projecting end tabs 48, 50 which project outwardly from the body 42 of the cap 40 when the ground strip 46 is assembled therewith, see FIG. 3. The ground strip 46 is configured and arranged such that the side portions from which the end tabs 48, 50 project extend through apertures in the cap 40 and extend down opposite exterior surfaces of the cap 40.

A sleeve assembly 52, formed from a conductive and preferably metallic material, has a generally cylindrical base portion 54, a radially outwardly extending and also generally cylindrical projecting rim 56 which has formed therein two pairs of inwardly projecting biasing or spring arms 58, 60 which receive and engage the over-voltage arrester assembly 36. The rim 56 is of greater diameter than the cylindrical base portion 54. An upper portion 62 of the rim 56 is cylindrical and the two pairs of upwardly projecting spring arms 58, 60 extend therefrom. The cylindrical upper portion 62 has a bridge portion 64 which extends horizontally across the open center of the cylindrical upper portion 62. An aperture 66 is provided through the bridge portion 64 and is generally centered with respect to the cylindrical upper portion 62 and also the cylindrical base portion 54, such that the aperture 66, the upper portion 62 and the base portion 54 are generally coaxial. A washer 68 is fitted around the cylindrical base portion 54 and abuts against the rim 56.

The over-voltage arrester assembly 36 is formed from a high amperage, ceramic, non-radioactive gas tube 70. A vent-safe assembly 72 is provided in association with the gas tube 70 to vent off gas in the event that the gas tube becomes unsealed. Such an over-voltage arrester assembly 36 and a vent safe assembly 72 is disclosed in U.S. Pat. No. 5,195,015, which disclosure is herein incorporated by reference, and therefore is not described herein.

The over-current assembly 34 is provided in order to achieve over-current protection in the protector unit 20. The over-current assembly 34 includes a fail-safe assembly 38, a positive temperature coefficient resistor 90 (hereinafter "PTCR"), a plastic housing 92, a conductive bobbin 94, a solder washer 96, a conductive elongated post contact 98 and a conductive C.O. side contact 100. The solder washer 96 also provides the PTCR fail-safe assembly 38 as discussed herein.

The ground assembly 74 is formed from a generally cylindrical body 76 of an insulative, non-conductive and preferably plastic material. The body 76 is mounted between the gas tube 70 and the sleeve assembly 52 when the spring arms 58, 60 of the sleeve assembly 52 grip the gas tube 70. The body 76 has an axially central through aperture 78 and mounts a ground device 80. The ground device 80 has oppositely biased, upwardly projecting ear portions 82 and a central portion 84. The body 76 also provides a receptacle 86 for receiving a solder pellet 88 and normally holding the same in physical contact with the receptacle 86 and then with the gas tube 70. The structure of the ground assembly 74, the cap 40 and the sleeve assembly 52 are disclosed in U.S. Pat. No. 5,195,015, which disclosure has been incorporated by reference.

The PTCR 90 is a thin cylindrical disk-shaped member, or square-shaped member. The PTCR 90 used in the present invention can be ceramic or polymeric. A PTCR is a current rated device and is designed for specific service voltages. The PTCR 90 includes a pair of electrodes at opposite ends thereof. The PTCR 90 may incorporate leads and can be encapsulated, or be leadless and have electrodes on its larger surfaces.

The conductive C.O. contact 100 is provided at one end of the PTCR 90, designated the central office or equipment side, to assist with the installation of the protector unit 20 into the receptacle 32. The C.O. contact 100 is made of metal, preferably brass, and formed from a disc portion 102 having a cone-shaped portion 104 extending from a lower surface thereof. A circular groove 106 is provided in and around the disc portion 102. The upper surface of the C.O. contact 100 engages against the lower surface of the PTCR 90.

The elongated post contact 98 is provided at the other end of the PTCR 90, designated the "line" side. The post contact 98 is made of metal, preferably brass, and has an elongated cylindrical shaft 108 with a flat, disc-like head 110 at one end thereof. A conical tip 112 is provided at the other end of the elongated cylindrical shaft 108.

The cylindrical solder washer 96 mounts on the shaft 108 and has an axial aperture 114 which has a diameter which is slightly larger than the diameter of the shaft 108 but does not extend the entire length thereof. The solder washer 96 is formed from a low melt temperature alloy, typically around 281° F.

The conductive bobbin 94, made of metal, preferably brass, is also mounted on the elongated cylindrical shaft 108 and contacts the upper surface of the solder washer 96. The bobbin 94 is formed from a cylindrical portion 116 with a flat disc portion 118 on one end thereof. A central through aperture 120 is provided through the cylindrical portion 116 and the disc portion 118 through which the shaft 108 extends when the bobbin 94 is mounted thereon. The lower surface of the disc portion 118 engages against the upper surface of the solder washer 114 to maximize on surface contact area and to reduce overall contact pressures. When mounted on the shaft 108, the bobbin 94 does not cover the conical tip 112 of the nail-shaped contact 98.

The plastic housing 92 surrounds the bobbin 94, the solder washer 96, the post contact 98 and the PTCR 90. The housing 92 is formed from a tubular outer wall 122 having a top wall 124 which substantially closes the upper end thereof. An aperture 126, which has an internal diameter that is slightly larger than the diameter of the cylindrical portion 116 of the bobbin 94, is provided through the top wall 124 of the housing 92. In the bottom end of the cylindrical wall 122, internally projecting tabs 128 are provided.

To assemble these components, the solder washer 96 is mounted on the shaft 108 of the nail-shaped contact 98. Thereafter, the bobbin 94 is mounted on the shaft 108 until it contacts the upper surface of the solder washer 96. These components are placed within the housing 92 such that the cylindrical portion 116 of the bobbin 94 extends through the aperture 126 provided in the housing top wall 124. A portion of the shaft 108 of the post contact 98 extends through the housing aperture 126 extends outwardly from the housing 92. Next, the PTCR 90 is placed within the housing 92 such that the upper surface of the PTCR 90 engages against the lower surface of the disc-shaped head 110 of the post contact 98. After assembly of the bobbin 94, the solder washer 96, the post contact 98 and the PTCR 90 with the housing 92, the C.O. contact 100 is pushed upwardly into the housing 92 until it abuts against the lower surface of the PTCR 90. The circular groove 106 in the C.O. contact 100 accepts therein the internally projecting tabs 128 on the housing 92 to lock the bobbin 94, the solder washer 96, the post contact 98, the PTCR 90 and the C.O. contact 100 with the housing 92. The assembly is so designed that these components are compressed together with a light axial force. The reactive assembly force is absorbed by both ends of the housing 92.

Figure 3:
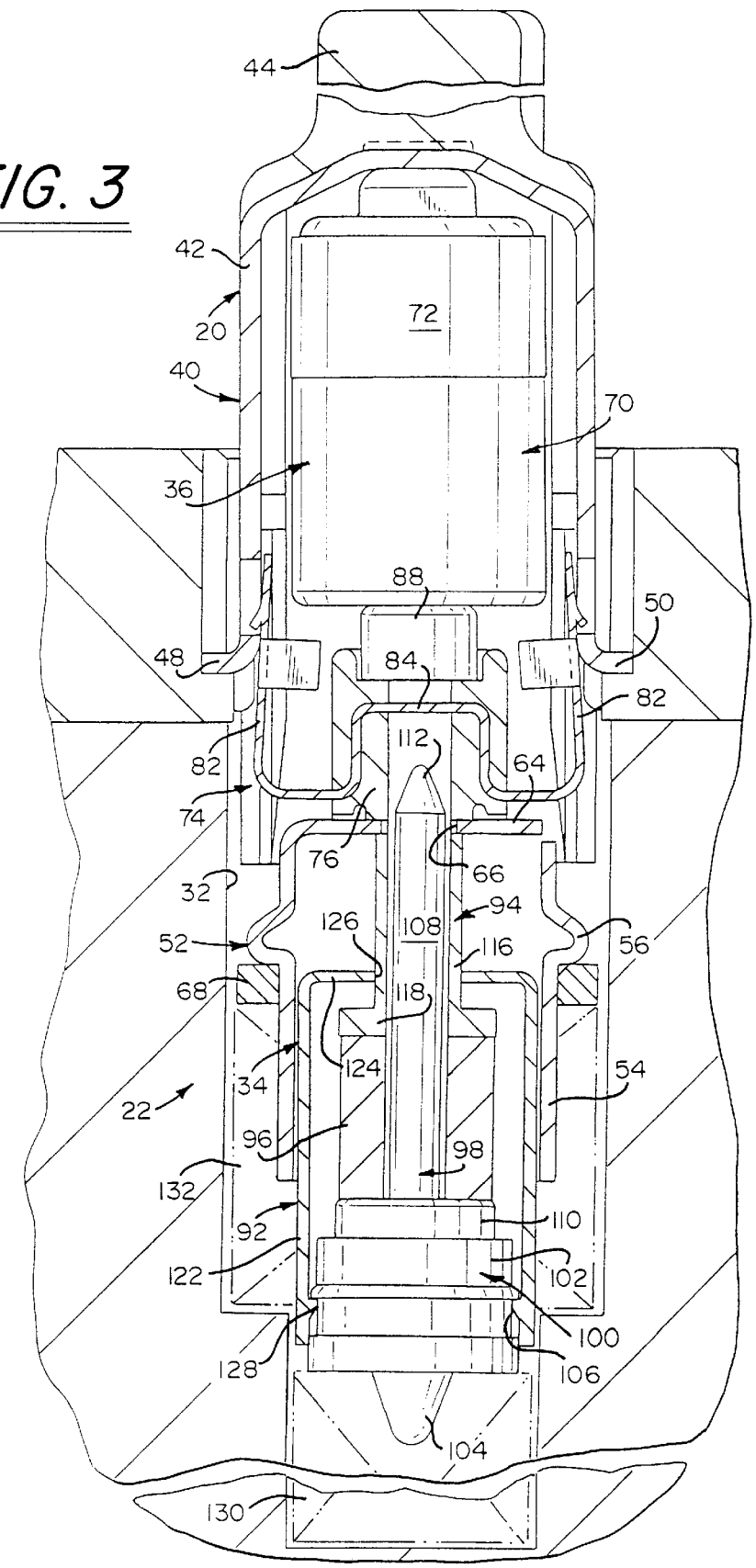
FIG. 3 is an enlarged, partial fragmentary, cross-sectional, side elevational view of the novel protector unit shown in FIG. 2 inserted into one of the receptacles of the connector block shown in FIG. 1 under predefined conditions.

When the protector unit 20 is assembled, as shown in FIG. 3, the housing 92 sits within the cylindrical base portion 54 of the sleeve assembly 52. The end of the bobbin 94 abuts against the underside of the bridge portion 64. The conical portion 112 of the nail-shaped contact shaft 108 extends through the aperture 66 in the sleeve assembly 52 and sits within the central aperture 78 in the ground assembly 74. Initially, as shown in FIG. 3, the conical tip 112 is spaced from the ground device 80 such that there is no contact between the shaft 108 and the ground device 80. The spring arms 58, 60 of the sleeve assembly 52 engage the gas tube 70 with the ground assembly 74 and solder pellet 88 mounted therebetween. The cap 40 surrounds the gas tube 70, solder pellet 88, ground assembly 74 and partially surrounds the sleeve assembly 52.

In operation, the protector unit 20 is installed into the terminal block 22 with the C.O. post contact 100 first entering the receptacle 32 therein. A biasing device, such as a spring 130 is mounted in the bottom of the receptacle 32 and engages against the C.O. post contact 100. A second biasing device or spring 132 is mounted within the receptacle 32 and engages the washer member 68. The ear portions 82 of the ground strip 80 respectively extend through the apertures in the end tabs 80 of the ground strip 46 and are in electrically conductive contact with the ground strip 46.

Ground potential is also brought around to a surface at the opposite end of the gas tube 70 at its line electrode. This surface is provided by the intermediate surface portion 84 of the ground device 80. The upwardly extending spring arms 58, 60 resiliently engage, and preferably electrically contact the ground device 80 at lower portions thereof adjacent its ear portions 82. Preferably, this engagement is by way of locking tabs which releasably lock in complementary through apertures provided in the ground device 80. Additional pairs of tabs extend radially inwardly from the upwardly projecting spring arms 58, 60 and contact the vent-safe assembly 72, which vent-safe assembly 72 is in electrical contact with the line electrode of the gas tube 70 when the solder pellet 88 melts as a result of a prolonged over-voltage condition and heating of the gas tube 70.

Upon occurrence of an over-voltage condition, the gas tube 70 will normally arc to pass the over-voltage to ground across the arc gap. Upon failure of the gas tube 70, the arc gap in the vent-safe assembly 72 may discharge an over-voltage on the incoming communications line.

Upon occurrence of a sustained over-voltage which causes sufficient heating from the gas tube 70, solder pellet 88 will melt. Upon melting of the solder pellet 88, the ear portions 82 will be moved by action of the spring 132 into conductive contact with the line contact which is in electrical contact with the electrode of the gas tube 70. A secondary ground connection might also be established by the melting of the solder pellet 88 into through aperture 78 of the body 76 of the ground assembly 74 in such a manner so as to contact line electrode of the gas tube 70 and also the ground surface. If the solder pellet 88 should melt outwardly and over the sides of the body 74 of the ground assembly 74, it might also contact the ear portions 82 while still contacting vent-safe assembly 72 which is in contact with the line electrode.

This method of providing over-voltage protection is described in U.S. Pat. No. 5,195,015, which disclosure has been incorporated by reference.

Upon the occurrence of an over-current or sneak current, The PTCR 90 senses the over-current and thermally reacts to switch to a very high impedance state, preventing further passage of current through the protector unit 20. After the fault current is removed, the PTCR 90 cools and returns to its initial state. Some resistive change of the PTCR 90 may be detected after exposure above the PTCR's curie temperature, or activation temperature. Once reset, the PTCR 90 is ready for any subsequent "sneak currents" and will continue to cycle in this fashion numerous times, until the PTCR 90 reaches its end-of-life. Typically, the size of the PTCR 90 dictates the level of current protection capability. A larger PTCR 90 can handle higher currents before reacting, or switching to near the "open state" condition (slight current leakage through the PTCR occurs).

Figure 4:
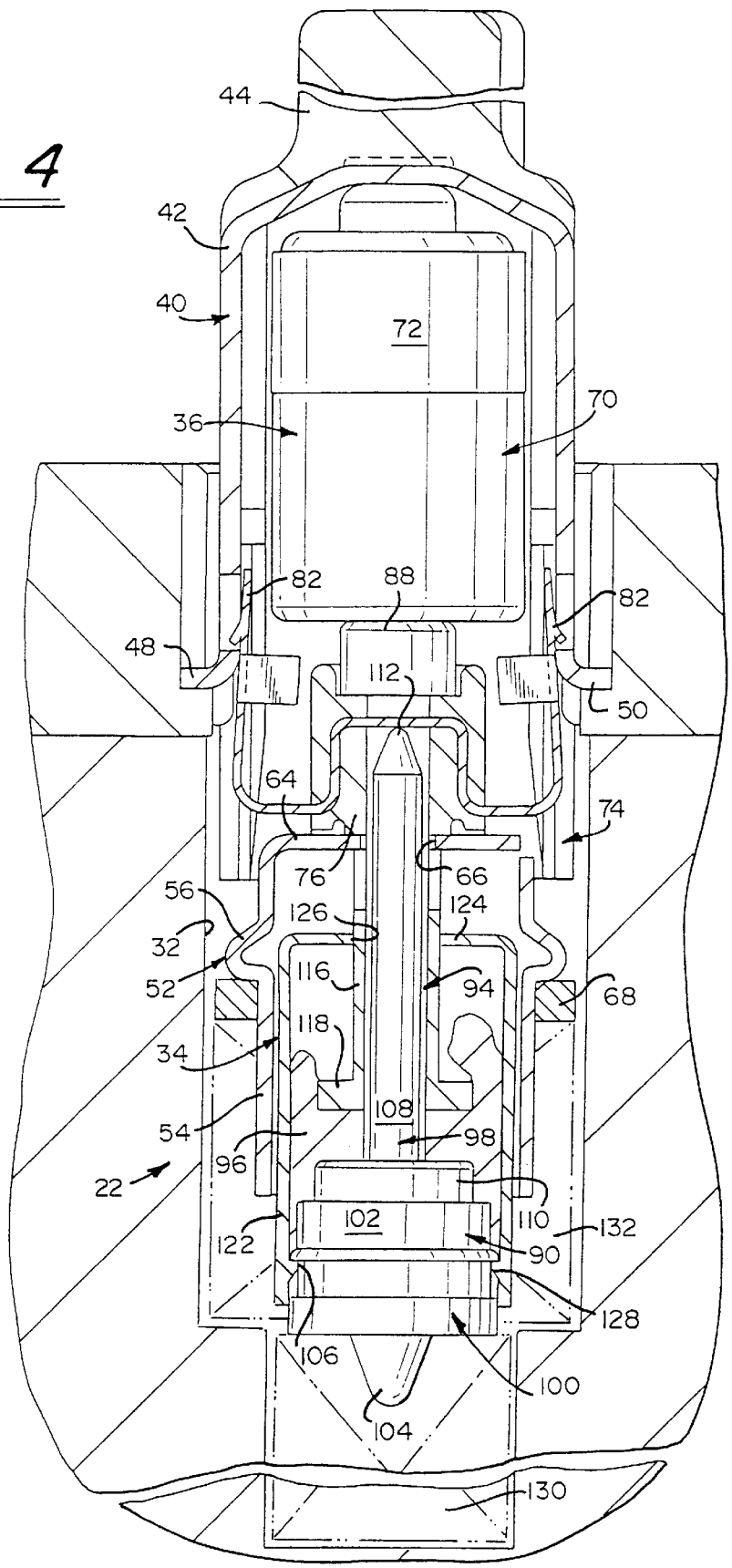
FIG. 4 is an enlarged, partial fragmentary, cross-sectional, side elevational view of the novel protector unit shown in FIG. 2 inserted into one of the receptacles of the connector block shown in FIG. 1 under a predefined condition.

Upon occurrence of a sustained over-voltage which causes sufficient heating from the PTCR 90, solder washer 96 will melt between the nail-shaped contact 98 and the bobbin 94 to provide for a non-resettable fail-safe mechanism to prevent thermal runaway of the protector unit 20. The solder washer 96 is conductively sandwiched between the bobbin head 118 and the head 110 of the nail-shaped contact 98. The space consumed by the solder washer 96 is equivalent to the amount of travel needed to bring the protector unit 20 to ground. As the solder washer 96 melts due to heat absorption from the PTCR 90, the spring 130 will urge the C.O. contact 100, the PTCR 90 and the post contact 98 upwardly until the conical tip 112 of the post contact 98 contacts the central portion 84 of the ground device 80 of the ground assembly 74 as shown in FIG. 4. The melted solder washer 96 flows outwardly from between the bobbin 94 and the head 110 of the nail-shaped contact 98 so as to move the bobbin 94 away from contact with the housing 92. Once the solder washer 96 has melted, the protector unit 20 must be replaced.

As can be seen, the protector unit 20 of the present invention is designed to be a direct replacement of a non-resettable heat coil. This is achieved because all pertinent external current limiter features, and dimensions, are nearly identical, and therefore compatible with their intended end application. The protector unit 20 of the present invention is formed of small, low cost components that assembly together easily.

For a C-50 frame 24 as shown in FIGS. 5 and 6, the protector unit 20a is modified such that the cap 40, the gas tube 70, the solder pellet 88, the ground assembly 74 and the sleeve assembly 52 are eliminated. In a C-50 frame 24, the line spring 134 resting against the small end of the bobbin 94a, maintains the bobbin 94a in position, and as the solder washer 96a melts as a result of a sustained over-current condition, movement of all of the other assembly components occur due to the force of the opposing spring 136, driving the shaft 108a forward to a ground contact 138. The bobbin 94a moves into the housing 92a while the shaft 108a moves out. This is the same type of action that also occurs within the 300-type protector unit 20 shown in FIGS. 2–4, except in this embodiment, only one spring force (via spring 136) is provided at the C.O. contact 100 and the bobbin end of the protector unit 20a is fixed.

While preferred embodiments of the present invention are shown and described, it is envisioned that those skilled in the art may devise various modifications of the present invention without departing from the spirit and scope of the appended claims.

The invention claimed is:

1. A protector unit for use in a communication circuit, said protector unit being configured for use with a connector block in a biased fashion for making electrical contact with a subscriber's line and a line of a corresponding central office, said protector unit comprising:

a housing;

ground means for providing a connection to ground; and an over current assembly for temporarily preventing the passage of current through said protector unit when an over-current condition is detected and for allowing the passage of current through said protector unit when said over-current condition is no longer detected;

said over current assembly comprising a positive temperature coefficient resistor for detecting an over-current condition, said positive temperature coefficient resistor including a pair of electrodes, a conductive central office contact coupled to one of said electrodes of said positive temperature coefficient resistor and coupled to the central office, a conductive post contact coupled to the other of said electrodes of said positive temperature coefficient resistor and coupled to the subscriber's line, and a solder washer conductively connected to said positive temperature coefficient resistor, said solder washer melting and flowing when sufficient heat is generated by said positive temperature coefficient resistor to move said post contact into contact with said ground means to permanently prevent the passage of current through said protector unit.

2. A protector unit as defined in claim 1, wherein said positive temperature coefficient resistor switching to a very high impedance state upon detection of said over-current condition, thereby preventing passage of current through said protector unit.

3. A protector unit as defined in claim 1, wherein said positive temperature coefficient resistor thermally reacts when said over-current condition is detected to prevent the passage of current through said protector unit.

4. A protector unit as defined in claim 3, wherein said positive temperature coefficient resistor thermally cools and returns to an initial state which allows the passage of current through said protector unit when said over-current condition is no longer detected.

5. A protector unit as defined in claim 4, wherein said positive temperature coefficient resistor can repeatedly detect an over-current condition and prevent the passage of current through said protector unit and repeatedly cool to allow the passage of current therethrough when the over-current condition is no longer detected.

6. A protector unit as defined in claim 1, wherein said central office contact includes a cone-shaped end.

7. A protector unit as defined in claim 1, further including a conductive bobbin which is coupled to said post contact.

8. A protector unit as defined in claim 7, wherein said solder washer is positioned between said bobbin and said post contact.

9. A protector unit as defined in claim 1, further including an over-voltage arrester assembly.

* * * * *